US012724602B2

(12) United States Patent
Waterman

(10) Patent No.: US 12,724,602 B2
(45) Date of Patent: Sep. 1, 2026

(54) UPDATING IMAGE FILES

(71) Applicant: NCR Voyix Corporation, Atlanta, GA (US)

(72) Inventor: Simon Richard Waterman, Somerset (GB)

(73) Assignee: NCR Voyix Corporation, Atlanta, GA (US)

( * ) Notice: Subject to any disclaimer, the term of this patent is extended or adjusted under 35 U.S.C. 154(b) by 135 days.

(21) Appl. No.: 18/129,250

(22) Filed: Mar. 31, 2023

(65) Prior Publication Data

US 2024/0329960 A1 Oct. 3, 2024

(51) Int. Cl.
*G06F 8/658* (2018.01)

(52) U.S. Cl.
CPC .................................... *G06F 8/658* (2018.02)

(58) Field of Classification Search
CPC . G06F 8/60–66; G06F 9/45533–45558; G06F 2009/45562–45595
See application file for complete search history.

(56) References Cited

U.S. PATENT DOCUMENTS 6,959,436 B2 * 10/2005 Peng ......................... H04L 9/40 719/310
7,694,293 B2 * 4/2010 Rao ......................... H04L 67/34 717/172
11,436,377 B2 * 9/2022 Waterman ............. H04L 9/0643
12,073,207 B2 * 8/2024 Lim .................. H04W 28/0215
2002/0078209 A1 * 6/2002 Peng ....................... H04L 67/53 709/200
2005/0071385 A1 * 3/2005 Rao ........................... H04L 9/40
2015/0215374 A1 * 7/2015 Hundt ..................... H04L 67/02 709/219
2018/0088926 A1 * 3/2018 Abrams ................ H04L 67/568
2020/0042313 A1 2/2020 Shafi et al.
2020/0356806 A1 * 11/2020 Li ........................... G06F 18/22
2021/0406409 A1 * 12/2021 Waterman ............ G06F 21/602
(Continued)

FOREIGN PATENT DOCUMENTS

WO 2023217165 A1 11/2023

OTHER PUBLICATIONS

Taylor, O., et al., "Image Deltas", HackMD [online], 2020 [retrieved Oct. 27, 2024], Retrieved from Internet: <URL: https://hackmd.io/@owtaylor/Sk3O_dTXL>, whole document.*
(Continued)

*Primary Examiner* — Todd Aguilera
(74) *Attorney, Agent, or Firm* — Notaro, Michalos & Zaccaria P.C.; John S Economou

(57) ABSTRACT

Methods, server computers, and computer programs are disclosed. An example method is disclosed that includes inputting, into an update module, a first version of a predefined modular image file and a delta encoded image file defining differences between the first version and a second, updated, version of the predefined modular image file, and outputting, from the update module, the second, updated, version of the predefined modular image file, where each version of the predefined modular image file includes at least one layer defining executable instructions and is one of a plurality of predefined modular image files that can be assembled as an executable image file for execution as a software container element.

6 Claims, 10 Drawing Sheets

(56) References Cited

U.S. PATENT DOCUMENTS

| | | | | |
|---|---|---|---|---|
| 2022/0413825 | A1* | 12/2022 | Bruno | G06F 8/63 |
| 2023/0350669 | A1* | 11/2023 | Lim | G06F 8/71 |
| 2024/0095006 | A1* | 3/2024 | Waterman | G06F 8/63 |

OTHER PUBLICATIONS

Anoymous, "Driver", PCMag [online], 2022 [retrieved Oct. 29, 2024], Retrieved from Internet: <URL:https://web.archive.org/web/20220121172117/https://www.pcmag.com/encyclopedia/term/driver>, whole document.*

Anonymous, "Crate xdelta3", Docs.rs [online], 2022 [retrieved Apr. 24, 2024], Retrieved from Internet: <URL: https://web.archive.org/web/20220701043945/https://docs.rs/xdelta3/latest/xdelta3/>, whole document.*

Extended European Search Report for corresponding European Patent Application No. 24182090.1 dated Dec. 10, 2024.

* cited by examiner

| Bundle | Old Version file size (gzip) | New Version file size (gzip) | Delta (reduction vs. gzip) |
|---|---|---|---|
| Base O/S | 36M (9.6M) | 36M (9.6M) | 214K (98%) |
| Driver | 20M (6.5M) | 20M (6.5M) | 4.1K (94%) |
| SST Device Server | 21M (7.3M) | 21M (7.3M) | 11K (98.5%) |
| Common | 33M (13M) | 33M (13M) | 674K (95%) |
| Printer | 87M (33M) | 87M (33M) | 251K (99.2%) |
| Scanner | 102M (32M) | 102M (32M) | 15K (99.5%) |
| Utility | 153M (91M) | 154M (91M) | 20M (78%) |
| Totals | 452M (192M) | 453M (192M) | 21M (89%) |

UPDATING IMAGE FILES

FIELD OF THE INVENTION

The present invention relates to methods and computing devices for providing delta encoded image files that include data indicative of differences between an old and a new version of a modular image file, and the use of the delta encoded image files to efficiently update old versions of modular image files. In particular, but not exclusively, the present invention relates to a methodology in which a particular delta encoded image file is downloaded to a local computing device from a container image registry located on a remote server, and is then combined in an update module with a previous version of a particular modular image file stored in a cache memory of the local computing device to provide a new version of the image file.

BACKGROUND

It is known that self-service terminals (SSTs) and/or Point of Sale (POS) terminals and/or kiosks are used from time to time in the retail industry. SSTs, POS terminals and kiosks are typically used to enable a customer to conduct transactions with a retail establishment. Each SST, POS terminal or kiosk in any retail establishment may be connected to different peripheral devices. Each SST, POS terminal or kiosk may also execute different software, such as having different underlying operating systems (Linux®, Windows® etc.) and different software applications. This is typically dependent upon the retail establishment where the SST, POS terminal or kiosk is used, and the intended use of the SST, POS terminal or kiosk in the retail establishment. From time to time, the software executing on the SST, POS terminal or kiosk may also be upgraded or the connected peripheral devices may change. It will also be appreciated that each SST, POS terminal or kiosk may also render a specific graphical user interface (GUI) or a series of different GUIs according to the needs of the terminal/kiosk.

Due to the variations that are often present from terminal to terminal, software developers have started making use of software containers that contain the software that needs to be executed on terminals. Software containers isolate the running software thus helping to avoid complex platform dependencies. That is to say a software container is able to execute on one or more processors of a terminal independent of the computing environment of that terminal because the container includes all of the software (application code as well as any software dependencies) it needs to be executable in any computing environment. Additionally, because containers operate in their own isolated computing environment (except for certain predefined communication pathways with other software/hardware (such as access to specific files, specific ports, etc.) outside the software container), they are also particularly secure. Software containers are thus an effective way of packaging and distributing software for use on terminals and kiosks. Moreover, when a software or hardware upgrade is performed on a terminal, a new software container can be executed on the terminal that accounts for these upgrades. Also, since containers can be pre-built, complex builds on every terminal can be avoided. It is noted that software containers differ from virtual machines in various ways. For example, unlike virtual machines, containers do not require a hypervisor to be installed on the computing device. Software containers are also typically more lightweight and run faster than virtual machines. Furthermore, whereas virtual machines virtualize hardware to enable operating systems to run on the virtualized hardware, software containers generally virtualize at the operating system level, thereby enabling multiple containers to independently execute their respective applications/processes while sharing the kernel, binaries, libraries, etc. of a single host operating system.

SUMMARY

Certain embodiments of the present invention facilitate the efficient building of new modular image files that are to be used for assembly in an executable image file.

Certain embodiments of the present invention facilitate reduction in the use of network bandwidth in certain environments, such as retail environments, where downloading of new container image files is required.

Certain embodiments of the present invention enable software container images to be kept up-to-date in environments with constrained network bandwidth and/or unreliable network connectivity.

Certain embodiments of the present invention facilitate reduction in the time taken to update software container image files.

Certain embodiments of the present invention facilitate reduction in the costs required to keep software container image files up-to-date.

Certain embodiments of the present invention facilitate minimization of the amount of data that needs to be sent to a retail store for updating a container image file that is to be executed on an SST or POS terminal or the like.

According to an aspect of the present invention, there is provided a computer-implemented method for outputting an updated version of a predefined modular image file, comprising the steps of: inputting, into an update module, a first version of a predefined modular image file and a delta encoded image file defining differences between the first version and a second, updated, version of the predefined modular image file; and responsive to said inputting, outputting, from the update module, the second, updated, version of the predefined modular image file; whereby each version of the predefined modular image file comprises at least one layer defining executable instructions and is one of a plurality of predefined modular image files that can be assembled as an executable image file for execution as a software container element.

Aptly, in another aspect of the present invention, the method further comprises: receiving, at a proxy that is configured to communicate with a computing device and a container image registry located on a remote server, the delta encoded image file from the container image registry; and responsive to the receiving, inputting the first version of the predefined modular image file and the delta encoded image file into the update module.

Aptly, in another aspect of the present invention, the method further comprises: transmitting the second, updated, predefined modular image file to a computing device for assembly as part of an executable image file; whereby the computing device is optionally a point of sale terminal or self-service terminal or kiosk.

Aptly, in another aspect of the present invention, the method further comprises: receiving, from a computing device, a request for the second, updated, predefined modular image file.

Aptly, in another aspect of the present invention, the method further comprises: receiving the request at a proxy that is configured to communicate with the computing device and a container image registry located on a remote server.

Aptly, in another aspect of the present invention, the method further comprises: responsive to said receiving, determining, by the proxy, a presence of the first version of the predefined modular image file in a cache memory of the proxy.

Aptly, in another aspect of the present invention, the method further comprises: providing the delta encoded image file via the steps of: inputting the first version of the predefined modular image file and the second version of the predefined modular image file into a comparison module; and responsive to said inputting, outputting, by the comparison module, said delta encoded image file.

Aptly, in another aspect of the present invention, the method further comprises: assembling, at a computing device, an executable image file comprising the second, updated, predefined modular image file and at least one further predefined modular image file of the plurality of predefined modular image files, whereby the second, updated, predefined modular image file cannot be executed as a software container element without said at least one further predefined modular image file.

Aptly, in another aspect of the present invention, the method further comprises: responsive to executing the executable image file, providing the software container element as an element that contains executable software defined by the executable image file and that is executable on one or more processors of a computing device.

Aptly, in another aspect of the present invention, the method further comprises: providing the second, updated, predefined modular image file as at least one peripheral device driver image file; and providing the at least one further predefined modular image file as at least one base operating system image file and at least one software dependencies image file.

Aptly, in another aspect of the present invention, the method further comprises: providing the at least one peripheral device driver image file as a scanner driver image file and/or a printer driver image file and/or a scale driver image file and/or a laser scanner driver image file.

Aptly, in another aspect of the present invention, the method further comprises: providing the software dependencies image file as an image file comprising a driver layer and/or a common layer and/or a utilities layer.

Aptly, in another aspect of the present invention, the method further comprises: providing the update module as a module comprising executable instructions associated with a VCDIFF algorithm.

According to an aspect of the present invention, there is provided a server computer comprising one or more processors configured to execute executable software, wherein the executable software, when executed, is configured to: input, into an update module, a first version of a predefined modular image file and a delta encoded image file defining differences between the first version and a second, updated, version of the predefined modular image file; and output, from the update module, the second, updated, version of the predefined modular image file; whereby each version of the predefined modular image file comprises at least one layer defining executable instructions and is one of a plurality of predefined modular image files that can be assembled as an executable image file for execution as a software container element.

According to an aspect of the present invention, there is provided a computer-implemented method for outputting a delta encoded image file defining differences between a first version of a predefined modular image file and a second, updated, version of the predefined modular image file, comprising the steps of: providing a first version of a predefined modular image file; providing a second, updated, version of the predefined modular image file; inputting, into a comparison module, the first version and the second, updated, version of the predefined modular image file; and responsive to the said inputting, outputting, by the comparison module, the delta encoded image file defining differences between the first version and the second, updated, version of the predefined modular image file; whereby each version of the predefined modular image file comprises at least one layer defining executable instructions and is one of a plurality of predefined modular image files that can be assembled as an executable image file for execution as a software container element.

Aptly, in another aspect of the present invention, the method further comprises: storing the first version of the predefined modular image file and/or the second, updated, version of the predefined modular image file and/or the delta encoded image file in a container image registry.

Aptly, in another aspect of the present invention, the method further comprises: providing the delta encoded image file as a binary delta encoded image file.

Aptly, in another aspect of the present invention, the method further comprises: providing the comparison module as a module comprising executable instructions associated with a VCDIFF algorithm.

According to an aspect of the present invention, there is provided a server computer comprising one or more processors configured to execute executable software, wherein the executable software, when executed, is configured to: input, into a comparison module, a first version and a second, updated, version of a predefined modular image file; and output, from the comparison module, a delta encoded image file defining differences between the first version and the second, updated, version of the predefined modular image file; whereby each version of the predefined modular image file comprises at least one layer defining executable instructions and is one of a plurality of predefined modular image files that can be assembled as an executable image file for execution as a software container element.

According to an aspect of the present invention, there is provided a computer program comprising instructions which, when executed by a computing device, cause the computing device to carry out the steps of any of the methods of the present invention.

Certain embodiments of the present invention help provide a methodology by which network bandwidth, download time, and/or cost can be reduced when updating image files in local computing environments, such as retail stores.

Certain embodiments of the present invention help provide delta encoded image files that define differences between old and new versions of particular image files (i.e., the delta encoded image file includes data indicative of or representative of differences between the two image files) and implements these delta image files to efficiently update old versions of image files.

Certain embodiments of the present invention help provide a mechanism for determining a delta encoded image file by inputting an old version and a new version of a modular image file into a comparison module (wherein each modular image file has a limited number of layers (e.g., only or more layers) and is a functionally specific building block that can be combined with other modular image files to enable the assembly of an image file that is actually executable).

Certain embodiments of the present invention help provide a delta encoded image file with a significantly smaller file size (e.g., 70-99.9% reduction) than a file size of a full version of an image file. This delta encoded image file requires much less network bandwidth to download and can be more readily downloaded even in environments with limited network bandwidth and/or unreliable network connections.

Certain embodiments of the present invention help provide an efficient way of updating container software running on SSTs, POS terminals, or kiosks by reducing the amount of data that needs to be transmitted over a network for applying the update.

BRIEF DESCRIPTION OF THE DRAWINGS

Embodiments of the present invention will now be described hereinafter, by way of example only, with reference to the accompanying drawings in which:

FIG. 8 illustrates a difference in file size between a full modular image file and a corresponding delta encoded image file;

In the drawings like reference numerals refer to like parts.

DETAILED DESCRIPTION

Figure 1:
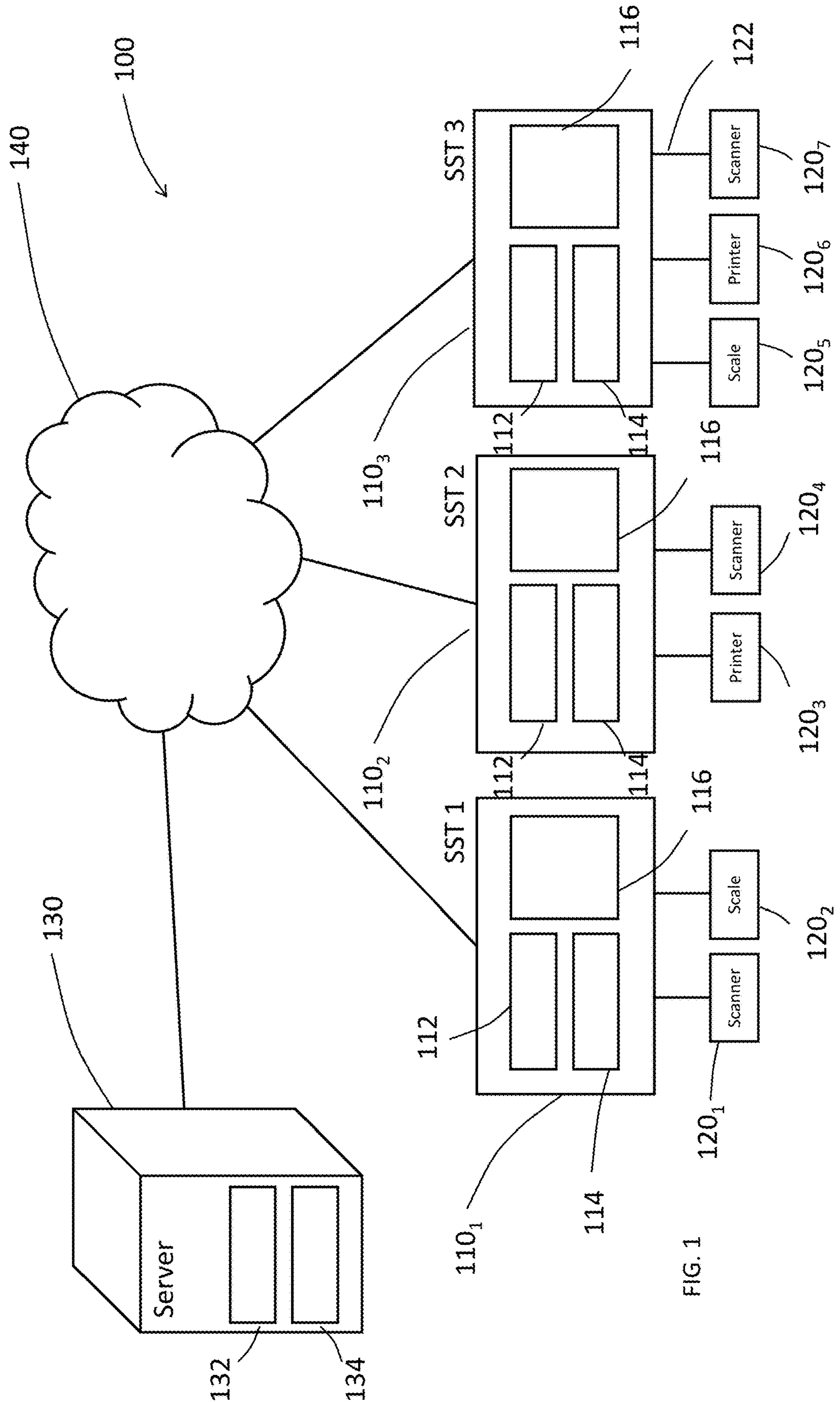
FIG. 1 illustrates a computing system.

When deploying a software container, a container engine (such as Docker®, RKT, CRI-O, and LXD or the like) may be utilized. The container engine can perform various functions including, but not limited to, accepting user requests or requests from an application programming interface (API) server of a container orchestrator (such as Kubernetes®, Swarm®, Mesos®, or the like); pulling image files (e.g., in a particular image format) from a registry; preparing a container mount point; preparing metadata that is needed to execute a software container; and calling a container runtime. The container runtime is a part of the container engine. The container runtime (such as runc, containerd, crun, railcar, kata containers, or the like) uses the mount point and the metadata provided by the container engine and communicates with the kernel (of a host OS) running on the computing device in order to execute a container image file and thereby create a software container.

When implementing multiple containers across multiple computing devices, a software container orchestrator platform may be used. These platforms are able to schedule container workloads across multiple computing devices (e.g., SSTs, POS terminals or kiosks) and are also able to provide a standardized application definition file (e.g., kube YAML, Docker® compose, or the like). Kubernetes® is an example of a container orchestration platform.

A Kubernetes® container orchestration platform is a cluster of units, including a controlling unit called the Kubernetes® master, which manages the cluster, and at least one node (or worker) which runs workloads (containers). One part of the Kubernetes® orchestrator platform is the kubelet. The kubelet is an agent that runs on every worker which is part of the Kubernetes® system. During operation, the kubelet receives commands (e.g., from an API server on a Kubernetes® master) that informs the kubelet what container(s) should be running on a computing device. In Kubernetes®, these containers are provided within "pods". Typically, a single pod includes a single container although it is possible to include multiple containers within a given pod. The kubelet passes—to a container engine (e.g., via a Container Runtime Interface (CRI))—information regarding what container(s) should be running on a computing device to enable execution of a software container via a container runtime within the container engine.

A software container is created when a container runtime executes an executable container image file. As such, a software container is essentially a runtime instance of an associated executable container image file. In this sense, an executable container image file is an image file that has all of the software it needs to at least be executable as a software container element. In more detail, a container image file is typically a binary file that includes all the necessary requirements for running a software container as well as any metadata describing needs and capabilities of the software container. The container image file itself may be made up of several layers that define the executable instructions needed for running the software container. For example, a container image file may include one or more layers which define a software application(s) executable code, one or more layers defining code for any software dependencies upon which the software application(s) rely, and one or more layers defining code for any required configuration settings. Container image files are often stored in a container image registry. Each container image file is stored in a particular container image format that defines the layers and metadata within a container image file. For example, the Open Container Initiative (OCI) image format defines the image file as tar files for each layer and a manifest file in JavaScript® Object Notation (JSON) format which specifies the metadata associated with the image file.

When deploying software containers on SSTs and POS terminals, if customized container images are built by end users (e.g., staff associated with a retail establishment) from scratch according to the needs of a specific terminal, this can result in knowledge of how to build the containers being propagated further than it should and introduces the risk that problems during the build process result in container images that do not function as expected. Taking this approach also often does not adapt well to real-world changes, which can only be accommodated by building a new container image.

To at least partially alleviates the above-noted concerns with end-user customized containers, pre-built container image files can be prepared in advance. In order to provide pre-built container image files to users that can work for any terminal, a single container image file may be created that includes all software that might possibly be needed independent of the hardware/software running on any given terminal. Alternatively, a series of unique container image files could be created, with each unique image file including a permutation of a subset of possible software from all of the possible software that might be needed on a terminal.

Creating a single container image file, however, presents problems in that it results in a container image (and thus a running container) that is suboptimal from a resource perspective (disk, RAM, etc.). For example, if a different portion of code was needed for each of 10 specific peripheral devices that are connectable to a terminal, then to ensure a software container image file has everything it needs independent of the hardware/software running on a specific terminal, all 10 portions of code would need to be included within the image file. This results in a container image file with a size that is much larger that what would be needed for a given specific terminal (e.g., a terminal with a single peripheral device). The large size of a container image file that includes software for execution on terminals with varying hardware configurations and/or peripheral device connections is likely to result in slower download and upgrade speeds as compared to a container image file that includes only the code needed for a specific terminal. In reality, there are many different peripheral devices (much more than 10) that could be connected to a terminal, and as such, the size of the pre-built single image file can be considerably large.

A technical problem associated with providing a container image file for each real-world combination of the software that might be needed on a specific terminal is that many different container images would need to be built, distributed, and managed. For example, if a different portion of code was needed for each of 10 specific peripheral devices that are connectable to a terminal, then to ensure there is a custom image file for each possible real-world combination, there would need to be an image file created for each unique subset of the 10 portions of code (e.g., image 1: portion 1; image 2: portion 1+portion 2; image 3: portion 1+portion 3, etc.). This would result in approximately 1000 distinct image files. In reality, there are substantially more than 10 peripheral devices that could be connected to a terminal, making the number of unique container images that would be needed significantly more than 1000.

An alternative approach to having a distinct image file for each possible peripheral device combination has been proposed which makes use of a series of modular image files that can be assembled together to create an executable image file that can then be executed as a software container element. This executable image file is assembled from the relevant modular image files (which are non-executable on their own) 'on the fly' according to specific needs of an SST or POS terminal. These modular image files may be referred to as micro container image files or just micro containers (μ-containers) and are functionally specific building blocks out of which larger runnable or executable container image files can be assembled. Assembly of an executable image file in this way helps to at least partly alleviate some of the aforementioned problems.

However, in some environments (such as retail stores), network bandwidth is often extremely limited. Thus, download of even the smaller modular micro container image files can take a considerable amount of time. Also, since container image files for the running software containers need to be kept up-to-date, this bandwidth is consumed on an ongoing basis, which can be detrimental to other processes that also require a certain bandwidth.

FIG. 1 illustrates a computing system 100. In the computing system 100, there are three self-service terminals (SSTs) 110$_1$, 110$_2$, 110$_3$. The SSTs are an example of a computing device. In certain other embodiments of the present invention, the computing device may be a Point of Sale (POS) terminal, a kiosk, an Automated Teller Machine (ATM), a personal computer, a laptop, a tablet or the like. Each SST includes one or more processors 112, at least one memory 114 and a display 116. The memory is a non-transitory computer-readable storage medium. The memory 114 stores executable software that is executable by the processors 112 of the SST. The displays 116 display a graphical user interface (GUI). Each SST may also include a communication interface (not shown) for communicating with a server and one or more communication interfaces (not shown) for communicating with connected peripheral devices.

In the system illustrated in FIG. 1, a scanner peripheral device 120$_1$ and a scale peripheral device 120$_2$ are connected to the first SST 110$_1$. Also, a printer peripheral device 120$_3$ and a scanner peripheral device 120$_4$ are connected to the second SST 110$_2$. Also, a scale peripheral device 120$_5$, printer peripheral device 120$_6$ and scanner peripheral device 120$_7$ are connected to the third SST 110$_3$. It will be appreciated in certain other embodiments of the present invention, each SST may be connected to different combinations of peripheral devices. Each peripheral device may communicate with the SST it is connected to via a wired interface 122.

It will be appreciated that in certain other embodiments of the present invention the interface may be wireless or a combination of wired and wireless. Each SST communicates with a server 130 via a network 140. The server is also an example of a computing device. The network 140 may be wired, wireless or a combination of wired and wireless. The server 130 also includes one or more processors 132 and at least one memory 134. The memory 134 is also a non-transitory computer readable storage medium. The memory 134 stores executable software that is executable by the processors of the server. The executable software of the SSTs and the server will be described in more detail below.

Figure 2:
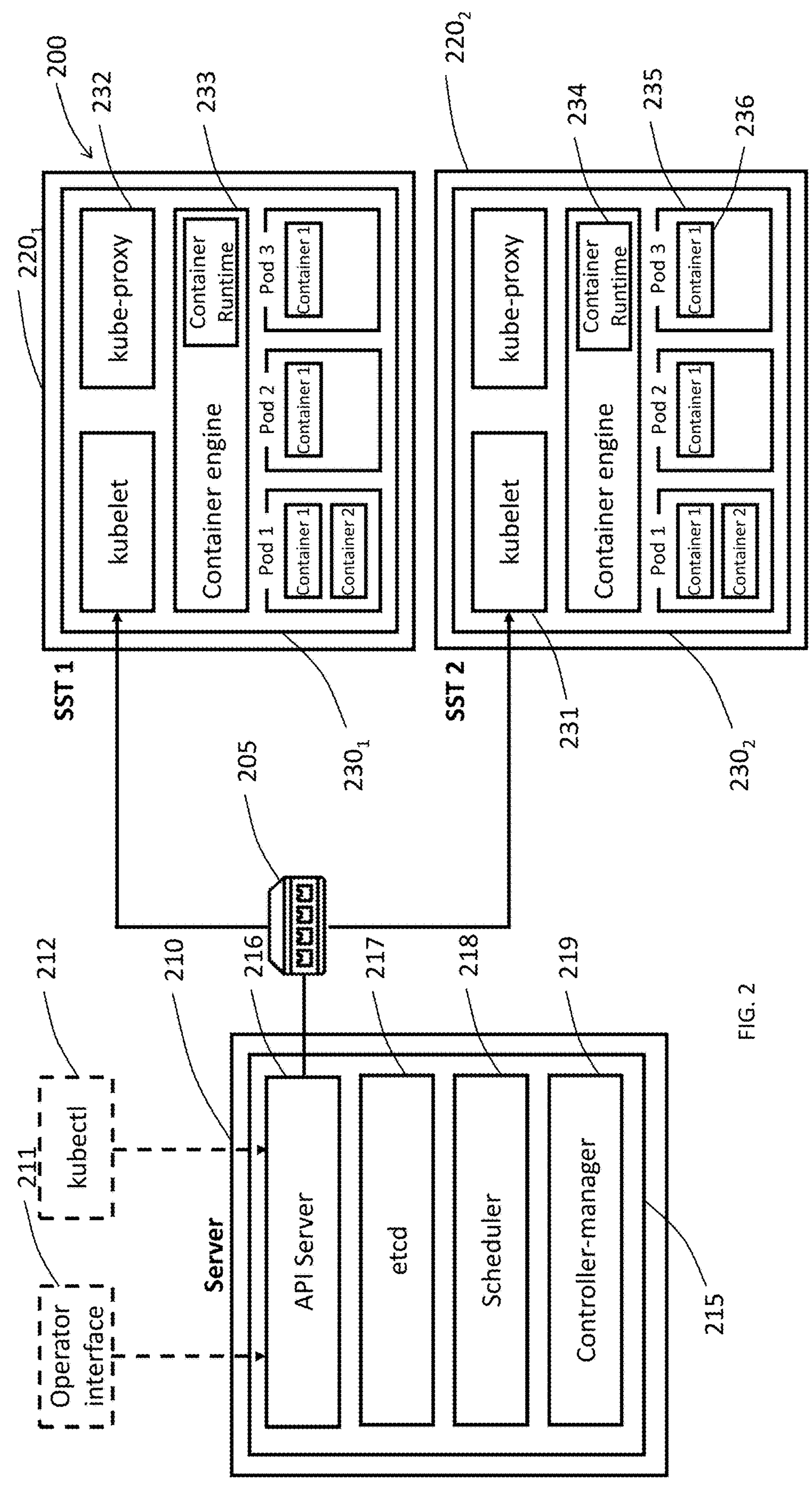
FIG. 2 illustrates a computing system under the control of a Kubernetes® orchestration platform.

FIG. 2 illustrates a computing system 200. The computing system has several components under the control of a Kubernetes® container orchestration platform. As such, the system may be referred to as a Kubernetes® cluster. The Kubernetes® cluster includes a server 210, on which a Kubernetes® master 215 runs, and self-service terminals (SSTs) 220$_1$, 220$_2$, on which respective Kubernetes® workers 230$_1$, 230$_2$ run (generically referred to herein at times as worker 230). It will be appreciated that the server 210 may be located within a same physical environment as the SSTs 220$_1$, 220$_2$ or may be a cloud server. The server 210 and the SSTs communicate over a network 205 such as a local area network or the Internet. The network 205 may be wired and/or wireless. It will be appreciated that other SSTs may be connected to the network 205 and run respective Kubernetes® workers.

The Kubernetes® master 215 which runs on the server 210 includes an API server 216 that manages the Kubernetes® cluster. The API server 216 records the state of the cluster based on information it receives from other internal components of the master 215 and interfaces with external components such as kubectl 212 and kubelets 231 respectively running on Kubernetes® workers 230$_1$, 230$_2$. Etcd 217 is a distributed database for the Kubernetes® cluster which stores information such as the configuration of the cluster. Etcd 217 also stores the desired state of the Kubernetes® workers 230$_1$, 230$_2$ and the actual state of the Kubernetes® workers 230$_1$, 230$_2$. A state may be understood as being an indication of the pods (e.g., Pod 3 235 on SST2 220$_2$) and their containers (e.g., container 236 in Pod 235) that are running on each Kubernetes® worker (e.g., 230$_2$) in the cluster. A scheduler 218 monitors when new pods are to be run on a Kubernetes® worker and then decides which Kubernetes® worker on which to deploy them. A controller-manager 219 runs controller processes which attempt to move the actual state of the Kubernetes® workers $\mathbf{230}_1$, $\mathbf{230}_2$ closer to the desired state specified on etcd 217. The master 215 also contains kubectl 212, a command-line tool for communicating with the Kubernetes® cluster via the API server 216, and an operator interface 211.

Each Kubernetes® worker $\mathbf{230}_1$, $\mathbf{230}_2$ located within the Kubernetes® cluster runs on a respective SST. According to certain embodiments of the present invention, a worker 230 may run on a virtual machine of the SST. A worker 230 is able to communicate with other workers 230 and the master 215 through the network 205. Each worker 230 has a kubelet that manages the operation of the worker 230. The kubelet (e.g., kubelet 231 on SST $\mathbf{220}_2$) issues commands to the other components of the worker 230, monitors the pods running on the worker 230 (e.g., pod 235) and their containers (e.g., container 236), and communicates with the API server 216. The kubelet 231 receives deployment files and ensures that the containers 236 described in those deployment files are running and healthy. A kube-proxy, such as kube-proxy 232, is a network proxy which enables pods (whether in the same Kubernetes® worker or a different worker) to communicate. A container engine (e.g., engine 233) runs and manages containers, and receives commands from the kubelet and container images from a registry. The container engine prepares container metadata which is passed on to a container runtime (e.g., container runtime 234) that is responsible for running the containers within the Kubernetes® worker in which the container runtime is co-located.

The API server 216 of the Kubernetes® master 215 deploys pods to Kubernetes® workers. A pod commonly includes a single container, but can comprise multiple containers with similar functions, which would then share storage and network resources. A pod requests access to specific resources available to the worker through a kubelet (e.g., kubelet 231) and can communicate with other pods by using a kube-proxy (e.g., kube-proxy 232).

Figure 3:
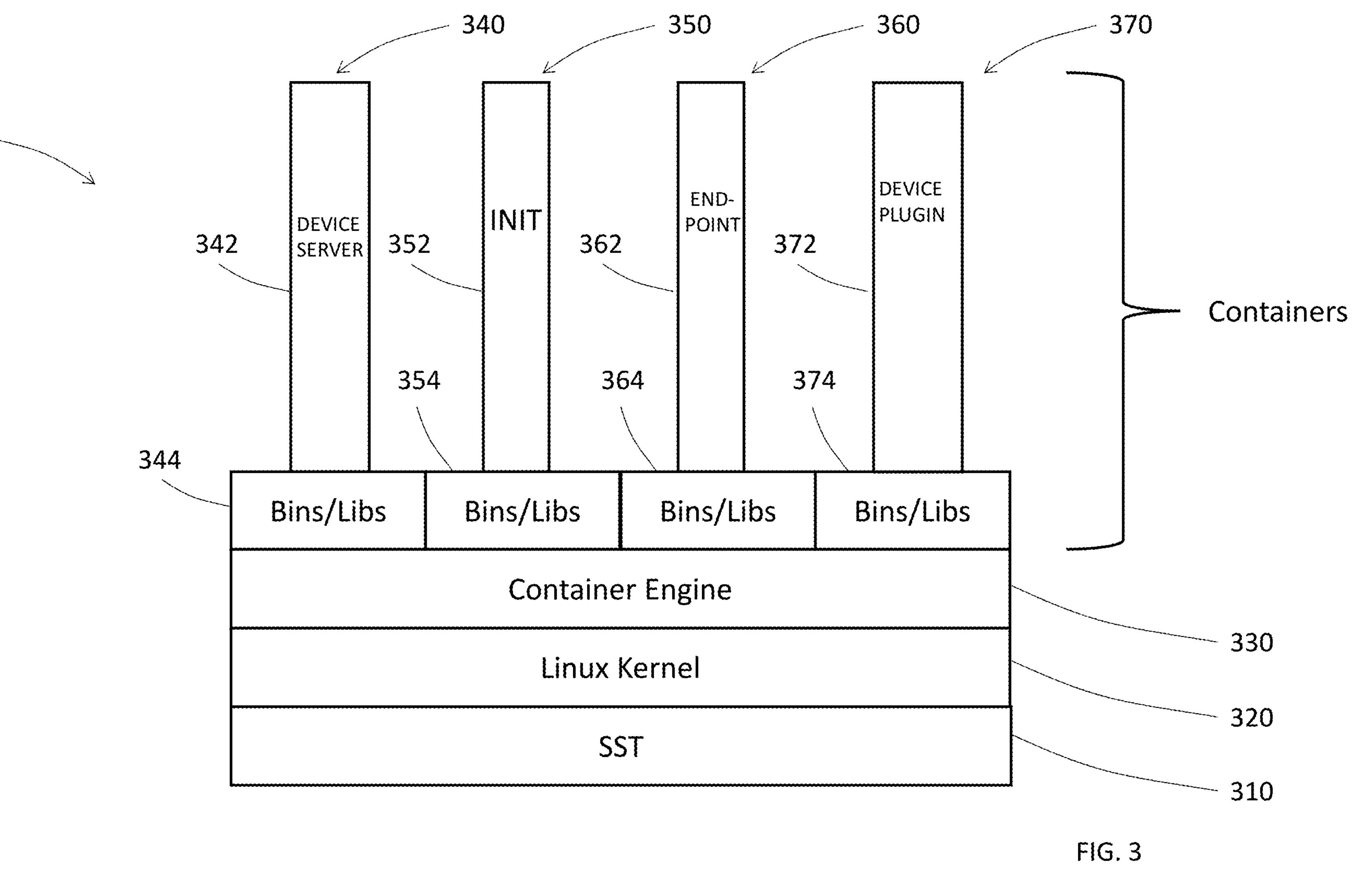
FIG. 3 illustrates a hardware and software architecture for a self-service terminal that executes several software containers.

FIG. 3 illustrates a hardware and software architecture 300 for a self-service terminal (SST) that is configured to execute several software container elements. In FIG. 3, the underlying hardware is an SST 310. This may be one of the SSTs described with respect to FIG. 1 or FIG. 2. As described hereinabove, the SST includes one or more processors and at least one memory. The memory stores executable software that is executable by the processors. The executable software includes a Linux® kernel 320 which may be part of a Host Operating System (such as Unix®, Ubuntu® or the like). It will be appreciated that in certain other embodiments of the present invention other kernels and other host operating systems could be utilized (Windows®, Mac® etc.). Also included as part of the executable software is a container engine 330. The container engine is responsible for accepting user requests or requests from an API server of a container orchestrator (such as Kubernetes®, Swarm®, Mesos®, or the like), pulling image files (in a particular image format) from a registry, preparing a container mount point, preparing metadata that is needed to execute a software container, and calling a container runtime. The container runtime (not shown) is a part of the container engine. The container runtime (such as runc, containerd, crun, railcar, kata containers, or the like) uses the mount point and the metadata provided by the container engine and communicates with the Linux® kernel 320 running on the computing device to execute several container image files and thereby create corresponding software containers.

The executable image files for each of the software containers shown in FIG. 3 may be assembled as described herein. Once assembled, they may be stored in memory on the SST. In FIG. 3, four software container elements are illustrated. A first software container element 340 is referred to hereinafter as the device server container. The device server container includes application software 342 and associated binaries and libraries 344 (the binaries and libraries may be referred to as software dependencies). The application running in the device server container is responsible for controlling, configuring, or otherwise accessing one or more of the peripheral devices connected to the SST at a low level and exposing business level functions across the network to other components of the SST. For example, the device server container may talk via the 'USB' protocol to a scanner (low-level) and report scanned bar-codes (business level) to other components. The software within the device server container is able to use or interact with the peripheral devices at least in part by accessing the peripheral device paths.

A second software container element 350 is hereinafter referred to as the INIT container. The INIT container 350 includes application software 352 and associated binaries and libraries 354 (the binaries and libraries may be referred to as software dependencies). The application running in the INIT container 350 initializes in its Pod before the main (non-INIT) containers start. The INIT container 350 is a concept of the Kubernetes® system but it will be appreciated that containers which are configured to execute first (i.e., before other containers) may also be utilized in other container orchestration platforms.

A third software container element 360 is referred to hereinafter as the Endpoint container. The Endpoint container 360 includes application software 362 and associated binaries and libraries 364 (the binaries and libraries may be referred to as software dependencies). The application running in the Endpoint container 360 makes information about an SST, such as the motherboard Universally Unique Identifier (UUID), available to the rest of the Kubernetes® cluster.

A fourth software container element 370 is referred to hereinafter as the device plugin container. The device plugin container 370 includes application software 372 and associated binaries and libraries 374 (the binaries and libraries may be referred to as software dependencies). The application running in the device plugin container 370 is responsible for advertising what peripheral devices are connected to the SST. As can be seen in FIG. 3, each software container element has its own binaries and libraries (bins/libs). However, it will be appreciated that according to certain other embodiments of the present invention any combination of containers could share bins/libs.

Figure 4:
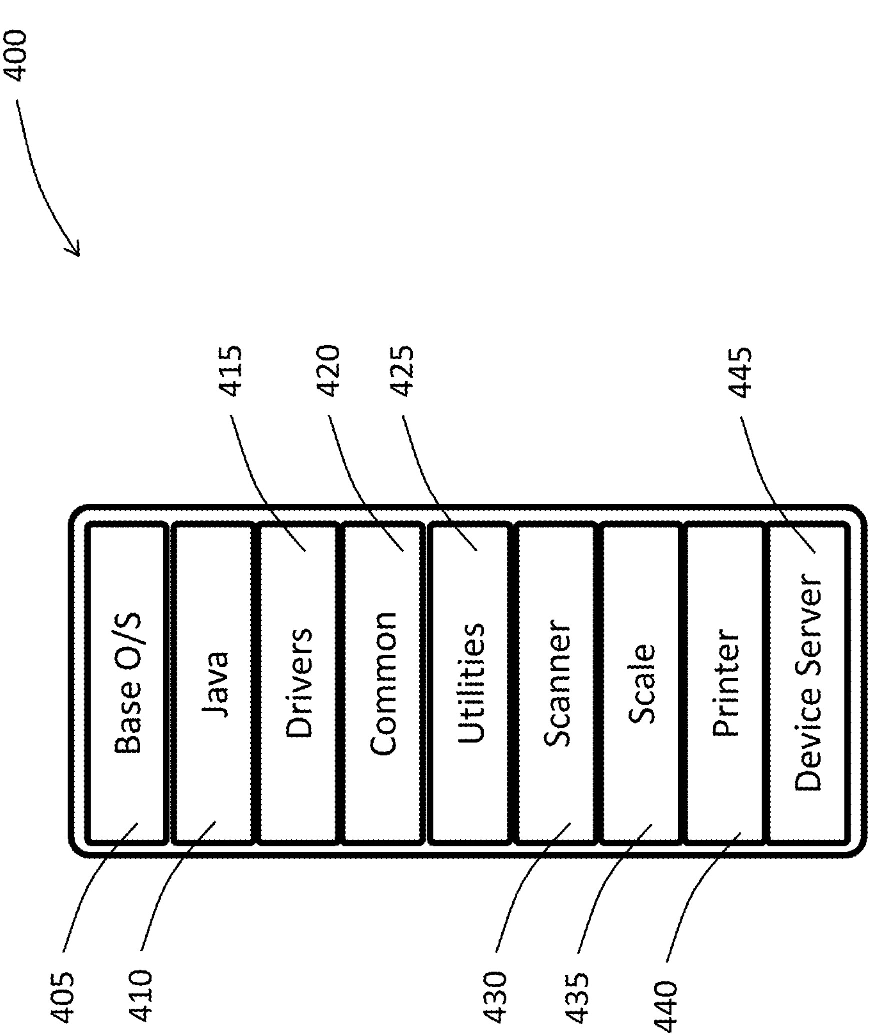
FIG. 4 illustrates the layers of an executable image file.

FIG. 4 illustrates a schematic representation of an executable image file 400 for execution as a software container. The image file shown in FIG. 4 may be executable to provide the device server container of FIG. 3. The executable image file may be assembled as described in FIG. 10. As can be seen in FIG. 4, the executable image file has a Base Operating System layer 405, a Java® layer 410, a Drivers layer 415, a Common layer 420, a Utilities layer 425, a Scanner layer 430, a Scale layer 435, a Printer layer 440, and a Device Server layer 445. While the executable image file in FIG. 4 has been assembled from a series of modular image files each having a single layer, it will be appreciated that any combination of the layers in the executable image file may be combined into a single modular image file according to certain embodiments of the present invention. This may be the case for example with the Base OS layer 405 and the Java® layer 410. This may also be the case, for example, with the Drivers layer 415, the Common layer 420, and the Utilities layer 425. Additionally, while, in FIG. 4, the executable image file has been assembled from a series of single layer modular image files, each of the modular image files (e.g., the Java® image file or the Drivers image file) may have more than one layer in certain other embodiments of the present invention.

Figure 5:
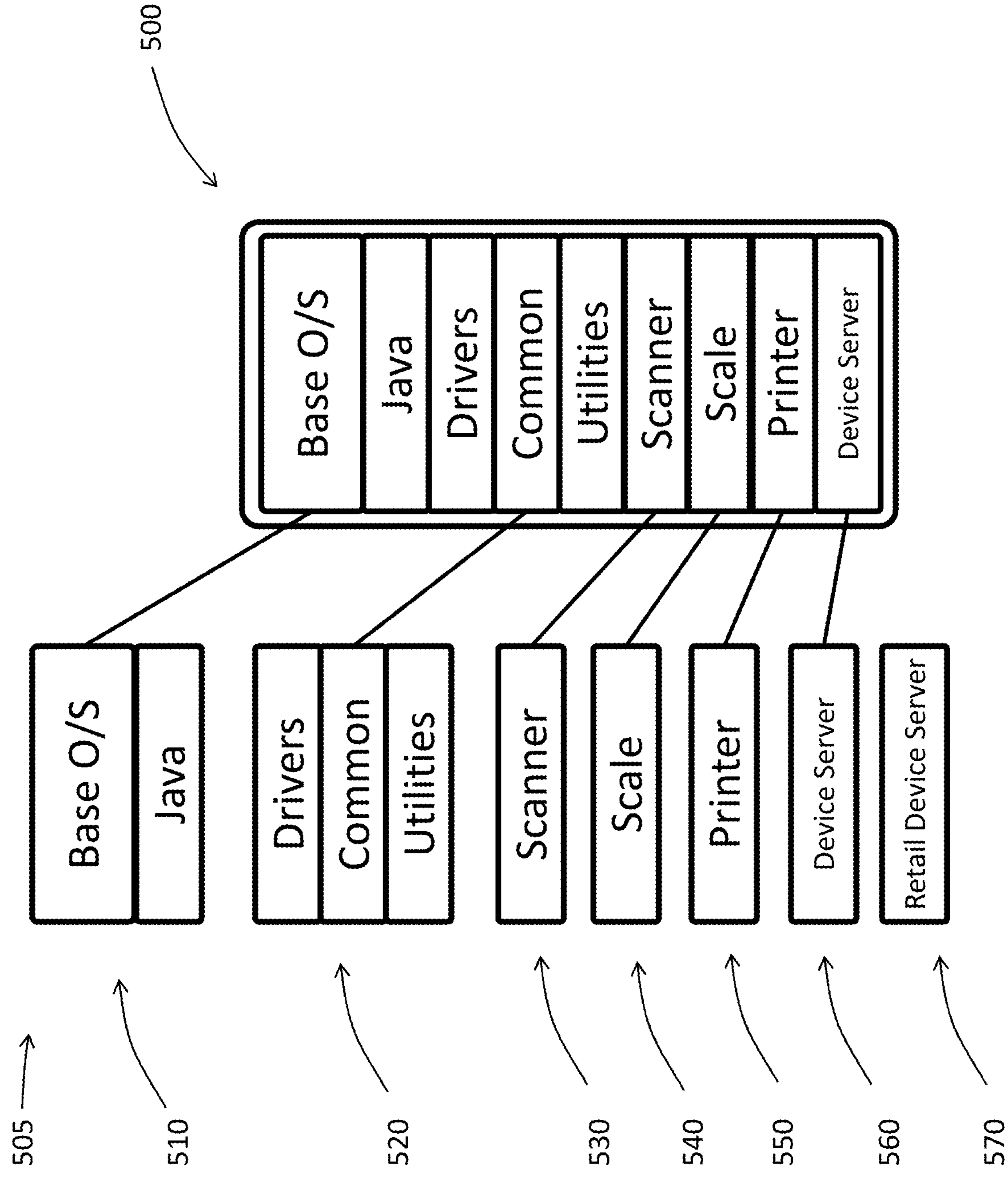
FIG. 5 illustrates the assembly of an executable image file from predefined modular image files.

FIG. 5 illustrates the assembly of an executable image file 500 from a series of predefined modular image files 505. The image file shown in FIG. 5 may be executable to provide the device server container of FIG. 3. In FIG. 5, there is a first predefined modular image file 510 with two layers, one layer defining executable instructions for a base operating system and one layer defining executable instructions for interpreting a Java® programming language. This may be referred to as a Base OS image file. Of course, in certain other embodiments of the present invention, the Base OS and Java® layers may be provided as separate modular image files. It will also be appreciated that in certain other embodiments of the present invention, the Java® layer may not be needed when other programming languages are used. The Base OS layer defines the operating system that is to be utilised within the software container (e.g., Ubuntu®). However, the Base OS layer may not be needed in certain other embodiments of the present invention.

FIG. 5 also illustrates a second predefined modular image file 520 with three layers. This may be referred to as a software dependencies image file. The first layer defines executable instructions for drivers. The Drivers layer is an optional layer which defines executable instructions responsible for installing user-space drivers into the image. An example of a user-space driver might be a low-level USB helper. It will be appreciated that some images may not require any user-space drivers. The second layer is a Common layer. The Common layer defines executable instructions containing framework components that are shared or used by other layers. An example of such a framework may be a logging framework that is used to control and capture logs from other components. The third layer is a Utilities layer. The Utilities layer is an optional layer defining executable instructions including user facing utilities and tools. An example of such a tool may be a system maintenance utility that can be used to view the list of devices that are installed on the SST and interact with them with operations such as running a diagnostic check. In certain other embodiments of the present invention, it will be appreciated that each of the drivers layer, the common layer, and the utilities layer may be provided within their own predefined modular image file. It will also be appreciated that the driver layer and/or common layer and/or utilities layer may not be required in certain embodiments of the present invention.

FIG. 5 also shows a third predefined modular image file 530 with a single layer defining executable instructions for communicating with a scanner peripheral device, a fourth predefined modular image file 540 with a single layer defining executable instructions for communicating with a scale peripheral device, and a fifth predefined modular image file 550 with a single layer defining executable instructions for communicating with a printer peripheral device. These image files may be referred to as peripheral device driver image files. It will be appreciated that the modular image files for the scanner, scale, and printer are image files associated with a specific scanner, scale, or printer. As an example, the scanner may be an NCR 2356 Hand Held Scanner, the scale may be an NCR 8789 Scale, and the printer may be an NCR 7169 thermal receipt printer. It will also be appreciated that in certain other embodiments of the present invention, modular image files associated with other peripheral devices (barcode reader, cameras etc.) may be needed. It will also be appreciated that the peripheral device image files shown in FIG. 5 may not always be needed.

In FIG. 5 there is also a sixth predefined modular image file 560 with a single device server layer defining executable instructions for controlling, configuring, or otherwise accessing one or more of the peripheral devices connected to the SST at a low level and exposing business level functions across the network to other components of the SST. FIG. 5 also shows an optional seventh predefined modular image file 570 with a single retail device server layer. The modular image file 570 may be used in place of the image file 560 when the container is to be executed on a POS terminal. It will be appreciated that other predefined modular image files usable to assemble other executable image files (e.g., for the other containers of FIG. 3) may be defined accordingly to meet the needs of the specific executable image file to be assembled.

A deployment file provides one way of specifying which layers are to be assembled for an executable image file. The deployment file can achieve this by encoding the layers in the name of the container. For example, each element of the name may be the name of a layer to include. Other ways of defining the layers to assemble could alternatively be used—for example a ConfigMap could list the layers and give the list of layers a name and then the name could be referenced as the image name.

Figure 10:
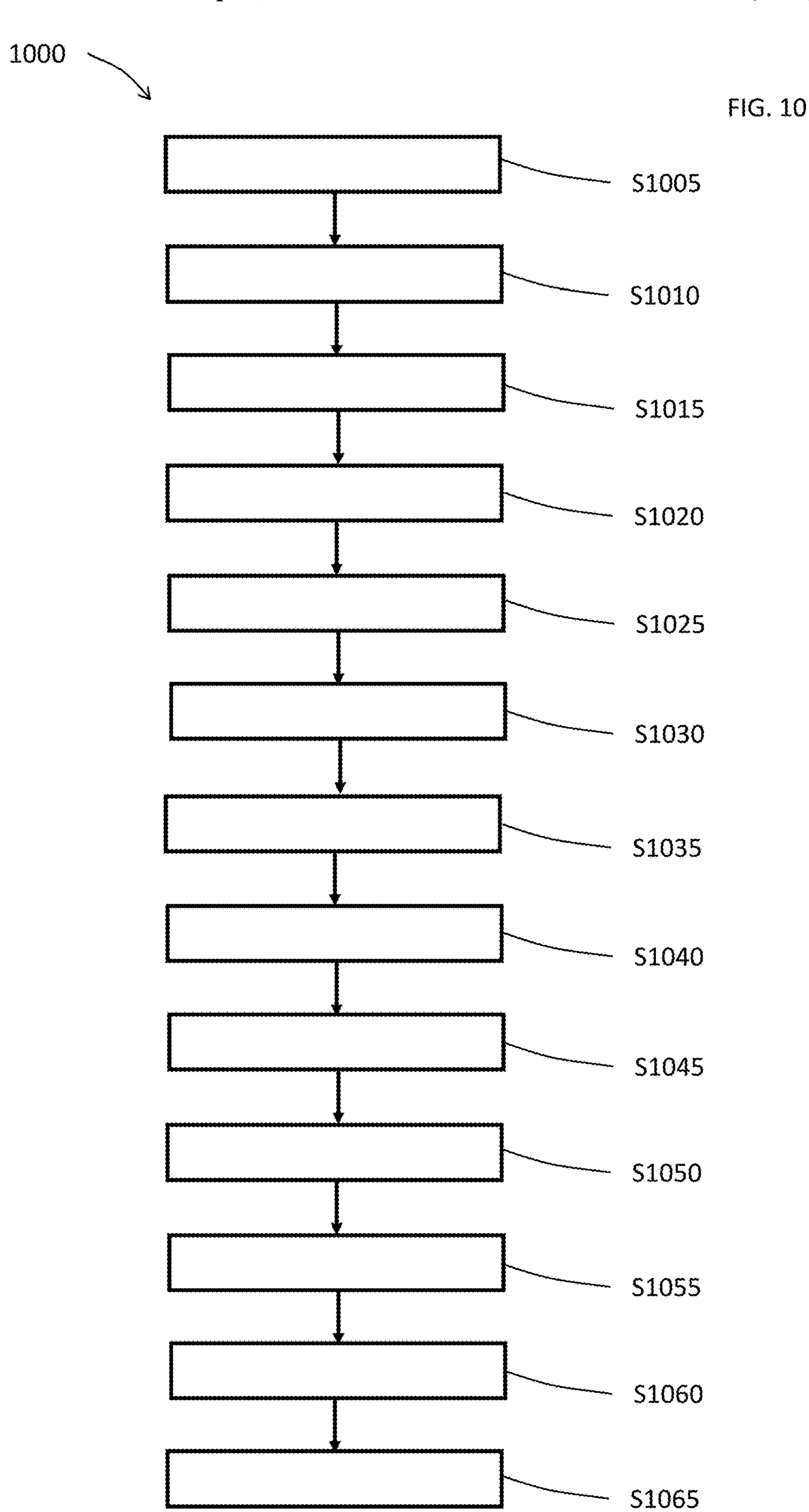
FIG. 10 illustrates a flowchart of certain steps carried out for providing a delta encoded image file and for updating a modular image file using the delta encoded image file.

A deployment file may be utilised by a Kubernetes® master or a container engine running on an SST to prompt some of the steps discussed in FIG. 10. That is to say, the container engine may process the deployment file to initiate the steps needed to assemble an executable image file from a series of predefined modular image files. The deployment file specifies the number and configuration of pods running a container or containers in a Kubernetes® cluster.

Figure 6:
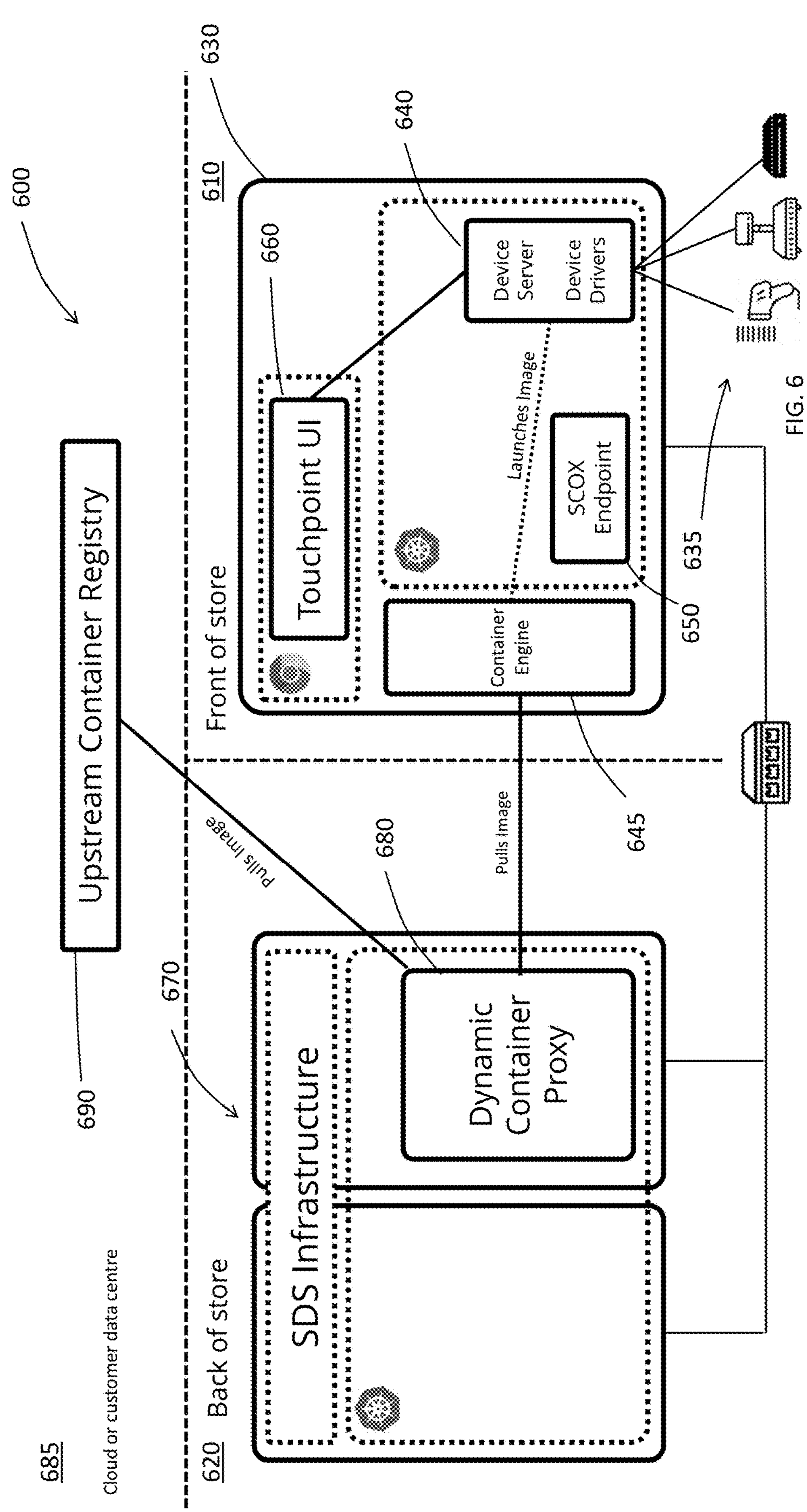
FIG. 6 illustrates a computing system that shows how requests for image files are handled.

FIG. 6 illustrates a computing system 600 with a front end 610 (i.e., in the front of a retail store) and a back end 620 (i.e., in the back of a retail store) and a cloud-based data center 685 (which is essentially a server remote from the retail environment associated with the front end 610 and back end 620). In the front end, there is an SST 630. This may be one of the SSTs as described above with reference to FIGS. 1-3. The SST has three connected peripheral devices 635. The SST 630 has processors (not shown) and a memory (not shown). The memory stores executable software that can be executed by the processors. In FIG. 6, the SST 630 is executing a first software container 640 and a second software container 650 within the Kubernetes® framework. The first software container 640 may be the device server container of FIG. 3. The second software container 650 may be the Endpoint container of FIG. 3. Also included within the SST 630 is executable software 660 associated with a User Interface of the SST. This is a web-based user interface. However, other browsers may be used in certain other embodiments of the present invention. The UI communicates with the first software container element 640 via an MQTT protocol. When a user interacts with the SST 630 via the user interface, commands are sent to the first software container element 640, which processes the commands. Once the commands are processed, the first software container 640 might communicate with the server and/or with the peripheral devices and/or may return instructions to the user interface as needed.

In the back end 620, there is a server computer pair 670. It will be appreciated that in certain other embodiments of the present invention, there may be only a single server computer or more than a pair of servers. Each server of the server pair 670 has one or more processors (not shown) and at least one memory (not shown) which stores executable instructions for execution by the processors of the server pair 670. The executable software of the server pair 670 includes a dynamic container proxy 680. The proxy 680 may be executed on any server of the server pair 670. The proxy 680 is also provided as a software container within the Kubernetes® framework. The proxy 680 is responsible for handling requests for container image files from a container engine 645 running on the SST 630. Within the cloud-based data center 685 there is an upstream container registry 690. The container registry 690 is responsible for storing a plurality of predefined modular image files that are accessible by the container engine 645 of the SST 630. The registry 690 is also responsible for storing delta encoded image files which define the differences between different versions of a modular image file (e.g., binary differences between an older version and a newer version of the modular image file). The modular image files may be referred to as micro-container image files or just micro-containers (μ-containers).

On startup of the SST 630 (when no containers are executing), the container engine 645 is executed on the processors of the SST 630 and the container engine 645 then sends a request to the proxy 680 for a certain executable image file. This request includes a name of an image defining a list of predefined modular image files that are required to assemble the executable image file. In response, the proxy 680 communicates with the registry 690 to determine whether the predefined modular image files required for the executable image file are stored therein. In particular, the registry 690 may pull an image manifest for each of the predefined modular image files stored in the registry 690 and then check that an image manifest is present for each of the predefined modular image files needed for the executable image file. If the proxy 680 determines that all necessary modular image files are stored in the registry 690, then the proxy 680 creates a new image manifest which defines each of the predefined modular image files the container engine will need to assemble the executable image file.

The proxy 680 then sends this manifest to the container engine 645. In response to receiving this manifest, the container engine 645 processes the manifest and communicates with the registry 690 to pull or obtain the predefined modular image files needed to assemble the executable image file. The container engine 645 knows which modular image files it needs as this is defined in the image manifest created by the proxy 680. Once all necessary modular image files are received, the container engine 645 then assembles these into a single executable image file. Assembly of the modular image files into the single executable image file is possible since the modular image files are additive. Thereafter, the container engine 645 executes the executable image file in order to provide a software container element.

Figure 7:
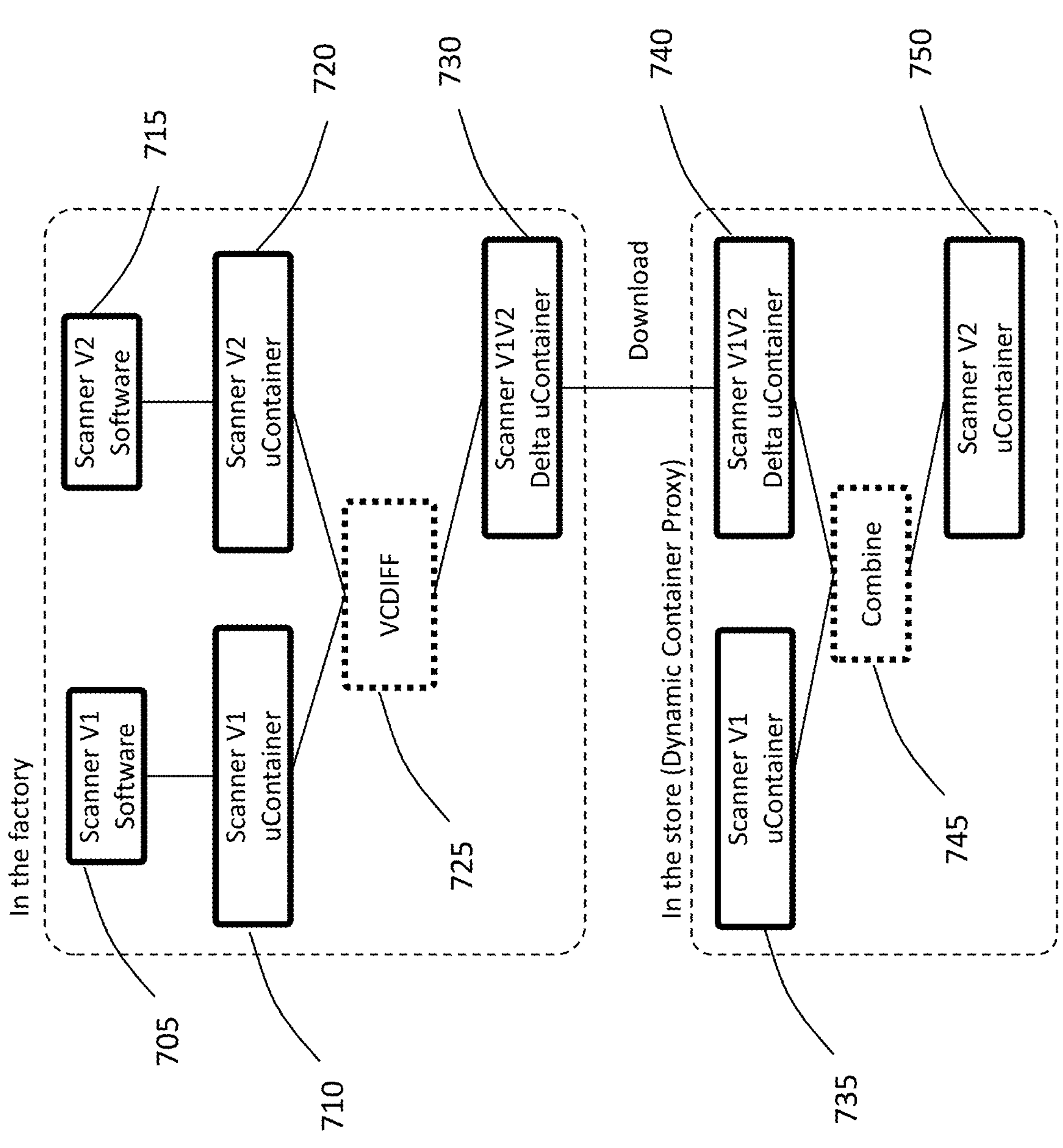
FIG. 7 illustrates the process of preparing delta encoded image files and of downloading these delta encoded image files for updating of a modular image file.

When a new version of a modular image file is created (due to some update of the underlying software in an existing modular image file), the process proceeds as illustrated in FIG. 7.

Upon development of a new modular image file (e.g., a new image file for scanner software 705), this image file is built and is stored/published in a container image registry. This may be the registry 690 of FIG. 6. In other words, when a new version of a software component is released, a modular image file (i.e., a μcontainer) is created to enable the component to be selected for use in a larger 'runnable' or 'executable' container image file. In the scanner example, this image file may be referred to as Scanner Version 1 (V1) μcontainer 710. It will be appreciated that the image file may be associated with any software (not necessarily scanner software). Thereafter, when an SST which requires a copy of ScannerV1 is started, this image file can be downloaded and assembled as part of an executable image file as described in FIG. 6. This may be done via a container engine on the SST (e.g., the container engine 645 of FIG. 6) requesting the proxy 680 for the appropriate image file and then the proxy 680 pulling the necessary modular image files from the registry 690. If ScannerV1 is the first version that has ever been downloaded by the proxy, the full ScannerV1 modular image file is downloaded from the registry and a copy is stored in cache of the proxy 680.

At some later time, when the scanner software 705 is updated to a newer version 715, version of the ScannerV1 image file 710 is also updated to provide a new, updated, version which may be referred to as ScannerV2 image file (or μcontainer) 720. In other words, this new version of the modular image file is built and is then also stored/published in the container image registry. In a comparison module 725, the initial version of the modular image file ScannerV1 and the new version of the modular image file ScannerV2 are provided as input. The comparison module 725 uses a VCDIFF algorithm to calculate the binary differences between the two modular image files and provides a delta encoded image file 730 as output. The binary delta encoded image file may be referred to as ScannerV1V2 delta μcontainer (or image file). As will be appreciated by one of skill in the art, VCDIFF is a protocol for efficiently representing the binary difference between two files: source and target. Given the source and the VCDIFF file, the target can also be reproduced. In embodiments employing a Linux® based OS, the xdelta3 tool may be used in the comparison module 725. The xdelta3 tool uses VCDIFF to generate the binary difference between ScannerV1 and ScannerV2. The resulting VCDIFF file is also packaged as a ScannerV1V2 container image file and stored/published in the container image registry.

In other words, the VCDIFF algorithm (embodied in the xdelta3 tool) generates a binary delta of the new μcontainer image file against the original μcontainer image file. If this delta is significantly smaller than the new μcontainer then a new 'delta μcontainer' (a delta encoded image file) is created and uploaded to the container registry along with the new μcontainer. The delta μcontainer may be given a tag that encodes the 'from' and 'to' versions, for example 'scanner: V4-V4.1'.

When an SST is updated and requires an up-to-date version of an executable image file, the SST sends a request for the image file to a proxy that communicates with the SST and the container image registry. The proxy may be the proxy 680 shown in FIG. 6. The proxy then attempts to obtain a copy of the requested image file (e.g., the ScannerV2 modular image file). As previously noted, the registry proxy may contain a cache of micro-container image files that have previously been downloaded. This may include the ScannerV1 modular image file 735. Thus, the registry proxy determines/checks whether a previous version of a specific modular image file is available in its cache memory. If the previous version is still present, then the proxy determines/ checks/queries if a relevant delta encoded image file is available in the upstream container registry. If it is, the delta encoded image file (e.g., Scanner V1V2 740) is pulled from the registry to the proxy (i.e., the registry transmits the delta encoded image file and it is received by the proxy) and the delta encoded image file 740 is then combined with the previous version of the modular image file 735 from the cache in an update module 745 to generate the required new version of the modular image file (ScannerV2 750). That is to say, the delta encoded image file (ScannerV1V2) and the previous version of the modular image file (ScannerV1) are input into the update module 745. Use of the VCDIFF algorithm (e.g., in the xdelta3 tool) in the update module 745 ensures that the reconstituted new version of the modular image file is bit-for-bit identical to the requested modular image file. The new version of the modular image file is then delivered/transmitted to the container engine on the SST to be assembled as part of the larger runnable image, as expected. A copy of the reconstituted new version of the modular image file (ScannerV2) is then stored in the cache on the proxy.

Alternatively, if there is no copy of ScannerV1 in the cache of the proxy or if the delta encoded image file has not been uploaded to the image registry, instead of downloading the delta encoded image file (ScannerV1V2) as described above, only the new version of the modular image file is pulled/downloaded (i.e., ScannerV2). A copy of this image file is then stored in the cache of the proxy for later use when the image file is updated.

FIG. 8 shows a table which demonstrates the possible reduction in the size of the file that needs to be downloaded from an upstream container registry in order to update a previous version of a modular image file. The column entitled “bundle” refers to various possible modular image files that can be updated. The “Versions” columns show the old and new versions of the modular image file. The “Old (gzip)” column shows the file size of the old (previous) version of the image file. The “New (gzip)” column shows the file size of the new, updated, version of the image file. The “Delta (reduction vs. gzip)” column shows the size of the delta encoded image file (defining differences between the old and new versions) and the reduction in size compared to the gzip size of the New version of the image file. As can be seen, a significant reduction in the size of the file that needs to be downloaded to a local store environment can be achieved by using delta encoded image files, thus helping to save on download time, network bandwidth and overall costs.

Figure 9:
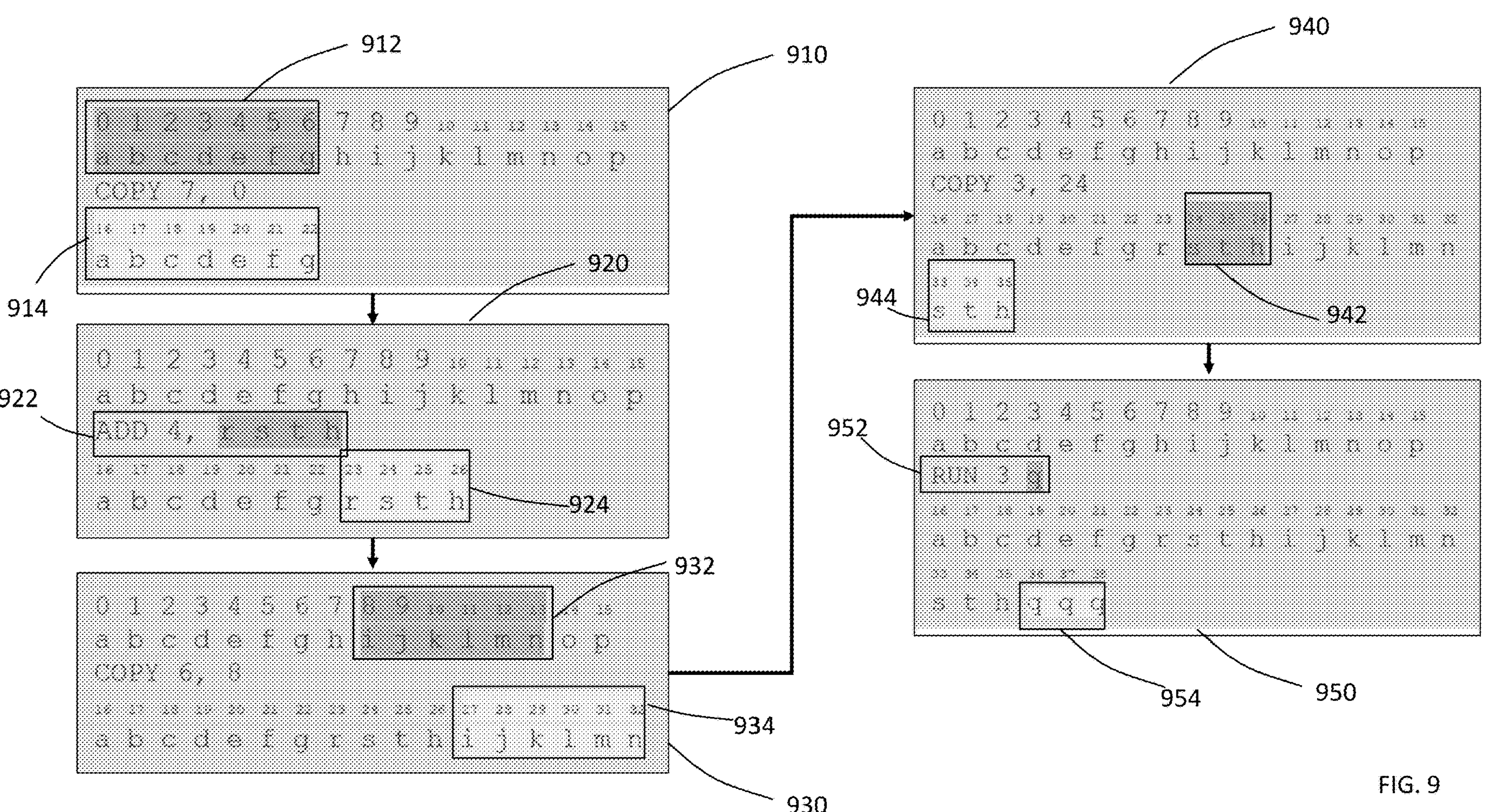
FIG. 9 illustrates a flowchart showing the principles of the VCDIFF algorithm.

FIG. 9 illustrates a simplified flowchart showing the principles behind the methodology of the VCDIFF algorithm. In the example shown in FIG. 9, an example previous version of a modular image file is shown with a sequence of bytes which is:

abcdefghijklmnop

While not a realistic sequence of bytes for a modular image file associated with the scanner software (or other peripheral device software), this simplified sequence helps to illustrate how VCDIFF operates.

An updated modular image file may have the following sequence of bytes (where some bytes have been added and some removed as compared to the previous version of the modular image file):

abcdefgrsthijklmnsthqqq

Given the previous version of the modular image file shown above and a delta encoded image file comprising data indicative of the differences between the two versions of the image file, the following sequence of VCDIFF instructions can be carried out to recreate the updated version of the image file as illustrated in FIG. 9.

At step 910, a COPY command can be implemented which copies 7 bytes (box 912) starting from position 0 of the first version of the image file (top two rows in step 910) into the new updated image file (box 914). Thereafter, at step 920, an ADD 4 r, s, t, h command 922 can be implemented which causes the bytes r, s, t, h (box 924) to be added to the new version of the modular image file. Then, at step 930, another COPY command can be implemented to copy 6 bytes (box 932) starting from position 8 of the first version of the image file into the new version of the image file (box 934). Then, at step 940, a further COPY command can be executed which causes 3 bytes (box 942) to be copied starting from position 24 of the new version of the image file into the new version of the modular image file (box 944). Note that this further COPY command copies a sequence that is already present in the output buffer rather than the source buffer. This enables re-occurring sequences in the output that do not appear in the input to be encoded efficiently. Finally, at step 950, a RUN 3, q command 952 can be executed to add a series of 3 q bytes to the end of the new version of the image file (box 954). The steps described above result in the second modular image file shown above being created. It will thus be appreciated that based on the original image file and the delta encoded image file, a VCDIFF algorithm can use these commands (as well as others) to reproduce the new version of the image file. Likewise, it will be appreciated that the VCDIFF algorithm can also be used in reverse and can produce a delta encoded image file given two versions of an image file.

It will now be appreciated how certain embodiments of the present invention provide a methodology by which new versions of μcontainers (modular image files) can be efficiently distributed to edge environments (e.g., retail stores) based upon the creation of delta (encoded) images, which capture the differences between the old and new versions of a particular μcontainer (modular image file). For example, according to certain embodiments of the present invention, the size of the delta image file between old and new versions may be around 10% of the size of the original image file.

In theory, the differential technique described herein can be applied to traditional container image files (in addition to μcontainers). However, because in traditional container images the layers of the container are ‘anonymous,’ it is difficult to know which layers in the new and original images to delta. It is possible to delta the container as a whole (i.e., all layers) but this loses the benefits of layer reuse and may negatively impact the overall required download bandwidth. These pitfalls are not associated with μcontainers because they are small (more akin to a layer) and functionally specific. Therefore, a μcontainer as well as the previous version of the same μcontainer can both be identified with relative ease, and as a result, so can the likely delta candidate.

FIG. 10 illustrates a flowchart 1000 of certain steps carried out by an SST for providing a delta encoded image file and for updating a modular image file using the delta encoded image file. The SST may be any of the SSTs illustrated in FIGS. 1-9. When an SST is initially deployed, it is known what software is to be installed on the SST and what peripheral devices are to be connected to the SST. Using this information, at step S1005, a deployment file is created for each software container that should be executed on the SST on startup. The deployment file, amongst other things, specifies a name of an image file. The image file name may define a list of modular image files that are needed for an executable image file. Sometimes the deployment file may also specify a version of the image file required. Otherwise, a default mode may assume that a newest version of the image file is always required. As discussed above, a ConfigMap may also be used to define the list of image files. Once the deployment file is created, the deployment file is uploaded to an API server of a Kubernetes® master that is running on a server in communication with the SST. The Kubernetes® master may be the same master as illustrated with respect to FIG. 2. The API server receives the deployment file and stores the deployment file in the etcd database of the Kubernetes® master.

At step S1010, the SST is powered on. This can occur, for example, when the terminal is first used that day, such as after a period during which the store is closed. It could also occur at other times such as when the terminal is restarted. The software on the SST, including the host OS and the Kubernetes® worker configuration, is then loaded from the memory of the SST and executed by processors of the SST. Thereafter, at step S1015, a controller-manager of the Kubernetes® master detects a difference between the pods that should be executing on a Kubernetes® worker associated with the SST as specified according to the etcd database and the pods that are actually executing on the SST. The available resources on the Kubernetes® worker will also be checked to determine that the resources required by a pod are available on the Kubernetes® worker. Responsive to detecting that one or more pods that should be executing on the SST are not, and that suitable resources are available, the API server of the Kubernetes® master sends information to a kubelet on the SST to resolve this inconsistency. This information includes a deployment file for each pod that is to be executed on the SST. It will be appreciated that according to certain other embodiments of the present invention that do not use the Kubernetes® orchestration platform, containers may be executed without the need to run the containers within pods (which is a particular feature of the Kubernetes® system). At step S1020, the kubelet receives the information from the API server and passes deployment files to a container engine element.

At step S1025, the container engine reads the deployment files and transmits a requests for an executable image file to a dynamic container proxy that is communicatively disposed between the container engine and an upstream container registry that stores a plurality of predefined modular image files. The dynamic container proxy is located locally (e.g., within the same Kubernetes® cluster) as the Kubernetes® master. It will be appreciated that on occasion, as in FIG. 6, one computing device may execute an instance of a Kubernetes® master and Kubernetes® worker concurrently. The request for an executable image file includes the name of the image file (from the deployment file) and a version of the image file which defines a list of modular image files needed for the executable image file. It will be appreciated that sometimes the proxy may be stored in a local memory of the SST. At step S1030, the dynamic container proxy parses the name of the image file to check which predefined modular image files are needed for the executable image file. In particular, the image file may encode a list of the names of the required predefined modular image files and their versions, and as such, the dynamic container proxy may identify the needed modular image files by parsing the image file name.

At step S1035, the proxy dynamically creates a container image manifest that defines each predefined modular image file to be included within the executable image file. These modular image files defined by the manifest are those which the deployment file specifies are needed for the executable image file. At step S1040, the proxy transmits the image manifest to the container engine. It will be appreciated that the steps performed by the proxy may be performed by the SST according to certain other embodiments of the present invention. The container engine then checks if any of the predefined modular image files are available in memory on the SST. If the container engine already has access to one or more of the new μcontainers specified in the manifest in memory on the SST, there is no need for the container engine to request them from the proxy. If, however, the image files are not accessible to the container engine on the SST, the container engine attempts to pull (download) these image files from the upstream container registry via the proxy. To do this, the container engine transmits a request to the proxy for the necessary image files. The proxy then performs a step (not shown) of checking that all specified predefined modular image files needed for the executable image file are available in memory. The proxy performs this checking step by receiving the manifests associated with each predefined modular image file either from a cache memory of the proxy or from an upstream container registry and then determining whether a corresponding image file exists for each predefined modular image file represented in the name of the image file sent from the container engine to the proxy.

If the proxy determines that an image file does not exist in its cache memory for an image file represented in the name sent to the proxy (because a newer version is available on the upstream container registry), at step S1045, the proxy queries the container registry for the existence of a suitable delta image to update a current version of the image file on the proxy to the newest version of the image file on the container registry. For example, if an image file for 'Scanner V1' μcontainer exists on the proxy but a 'Scanner V2' μcontainer is available on the registry, the proxy will query the availability of a 'Scanner V1V2' delta μcontainer on the registry. If there is no availability of a required delta image file on the registry, the proxy will request a full up-to-date image file (e.g., in the example above, 'Scanner V2' μcontainer).

If the required delta image file is available on the upstream container registry, at step S1050, the proxy receives the delta image file from the registry. The delta image file contains details about data that has changed between the current image file (μcontainer) on the proxy and the newest image file (μcontainer) in the container registry. At step S1055, the dynamic container proxy creates the newest image file using the delta image file and the current image file as described in FIG. 7. In this manner, all necessary predefined modular image files are made present and up-to-date in the proxy.

Once all necessary μcontainers are up-to-date in the proxy, at step S1060, the container engine receives each of the predefined modular image files needed to assemble the executable image file. These modular image files may be received from the proxy. Alternatively, these modular image files may be received from the container registry if they are not accessible from the proxy. The predefined modular image files received are those that have been defined in the image manifest received by the container engine. The receiving of the modular image files may also be referred to as 'pulling' the image files. Once the modular image files have been received by the container engine, at step S1065, the executable image file is assembled using each of the predefined modular image files received. The assembled executable image file can be executed as a software container element. The image file is thus executable in the sense that it has the capability of being executed as a software container. This contrasts with many of the predefined modular image files which cannot be executed as a software container on their own (i.e., without being assembled with other predefined modular image files into an executable image file). A next step (not shown) involves, executing, by the container engine, the executable image file to provide an instance of the executable image file as a software container element. The software container element thus contains executable software that can be executed on a processor (or multiple processors) of the SST. It will be appreciated that the steps described above which are performed by the container engine may be performed specifically by the container runtime of the container engine in certain embodiments of the present invention.

Another step (not shown) involves storing the executable image file in a memory of the SST and/or proxy and/or container registry. The executable image file then does not need to be assembled as described above every time the SST is restarted. However, if it is desired not to use memory for storing the image file, the executable image file may be assembled as described above each time the SST is started.

It will be appreciated that while certain embodiments of the present invention described above describe the assembly of a device server image file for a retail environment, certain other embodiments of the present invention may be used to assemble non-retail specific image files. The present invention can be used for any software that has a 'plugin architecture' where the plugins can be created as layers and assembled dynamically into a runnable container containing different combinations of the plugins.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

I claim:

1. A computer-implemented method for outputting an updated version of a predefined modular image file, comprising:

receiving, at a proxy executing on a computer at a back-of-store location, a request from a self-service terminal at a front-of-store location for an updated version of a predefined modular image file;

retrieving, by the proxy, a delta encoded image file from a cloud-based upstream container registry, the delta encoded image file defining differences between a first version of the predefined modular image file and a second, updated, version of the predefined modular image file generated using a VCDIFF algorithm, wherein the delta encoded image file includes a tag encoding an identity of the first version and an identity of the second, updated, version;

obtaining, at the proxy, the first version of the predefined modular image file;

applying the delta encoded image file to the first version using the VCDIFF algorithm to reconstruct the second, updated, version of the predefined modular image file, wherein applying comprises determining, based on the tag, whether the delta encoded image file is applicable to the first version prior to applying the delta encoded image file; and outputting the reconstructed second, updated, version, bit-for-bit identical to the second, updated, version of the predefined modular image file, wherein each version of the predefined modular image file comprises at least one layer defining executable instructions and is one of a plurality of predefined modular image files that can be assembled as an executable image file for execution as a software container element.

2. The method of claim 1, further comprising:

transmitting the reconstructed second, updated, predefined modular image file from the proxy to the self-service terminal for assembly as part of an executable image file.

3. The method of claim 1, further comprising:

assembling the executable image file comprising the second, updated, predefined modular image file and at least one further predefined modular image file of the plurality of predefined modular image files, wherein the second, updated, predefined modular image file cannot be executed as the software container element without having been assembled with the at least one further predefined modular image file.

4. The method as claimed in claim 3, further comprising:

providing the second, updated, predefined modular image file as at least one peripheral device driver image file; and providing the at least one further predefined modular image file as at least one base operating system image file and at least one software dependencies image file.

5. The method of claim 4, further comprising:

providing the at least one peripheral device driver image file as at least one of a scanner driver image file, a printer driver image file, a scale driver image file, or a laser scanner driver image file.

6. The method of claim 4, further comprising:

providing the software dependencies image file as an image file comprising at least one of a driver layer, a common layer, or a utilities layer.

* * * * *